United States Patent Office 3,634,433
Patented Jan. 11, 1972

3,634,433
PROCESS FOR PRODUCING 6,7-BENZOMORPHANE DERIVATIVES OF AMINE TYPE USEFUL AS ANALGESICS
Hiroaki Moriyama and Hisao Yamamoto, Nishinomiya, and Hideo Nagata and Toshio Tamaki, Ibaraki, Japan, assignors to Sumitomo Chemical Co., Ltd., Osaka, Japan
No Drawing. Filed May 27, 1968, Ser. No. 732,056
Claims priority, application Japan, June 7, 1967, 42/36,652
Int. Cl. C07d 39/00
U.S. Cl. 260—293.54
4 Claims

ABSTRACT OF THE DISCLOSURE

2' - hydroxy - 2 - (3" - methyl - 2" - butenyl) - 5,9 - dimethyl-6,7-benzomorphane is produced by reacting 2'-acetoxy-2,5,9-trimethyl-6,7-benzomorphane with β,β-dimethylacryl chloride to yield 2'-acetoxy-2-(3"-methyl-2"-butenoyl)-5,9-dimethyl-6,7-benzomorphane and further reacting the resultant 2'-acetoxy-2-(3"-methyl-2"-butenoyl)-5,9-dimethyl - 6,7 - benzomorphane with diisobutylaluminumhydride. Many other 6,7-benzomorphane derivatives of an amine type useful as analgesics are produced similarly by reacting a 2-methyl-6,7-benzomorphane derivative with acid halide to yield a 6,7-benzomorphane derivative of an amide type and further reacting the latter with trialkylaluminum or dialkylaluminum hydride.

---

The present invention relates to a process for producing benzomorphane derivatives. More particularly the present invention pertains to a process for producing 6,7-benzomorphane derivatives of an amine type which are known as very valuable analgesics having a minimum addiction and remarkable activity and to a process for producing 6,7-benzomorphane derivatives of an amide type which are important intermediates of the said 6,7-benzomorphane derivatives of an amine type.

For production of 6,7-benzomorphane derivatives of an amine type, there were proposed two processes.

That is, for example, the specification of Japanese patent publication No. 21,622/1965 disclosed the process shown, for example, by the following scheme:

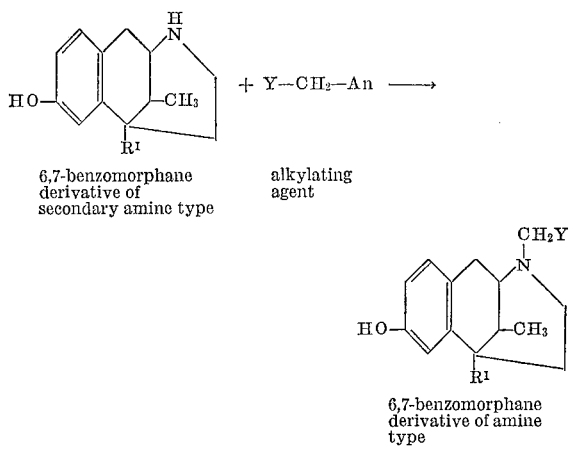

6,7-benzomorphane derivative of secondary amine type alkylating agent 6,7-benzomorphane derivative of amine type wherein R¹ is methyl or ethyl; Y is a lower alkenyl, halo lower alkenyl, lower alkinyl, cyano lower alkinyl or cycloalkyl; and An is an inorganic or organic anion.

However, as mentioned in said patent publication, the 6,7-benzomorphane derivative of secondary amine type mentioned above must be prepared by treating a 2-methyl-6,7-benzomorphane derivative represented by the formula,

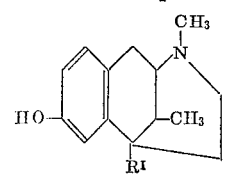

wherein R¹ has the same meaning as defined above, with bromocyane, followed by the hydrolysis. Therefore, the said process is notably complicated and yield of the desired product is very poor.

It is also known in the specification of Japanese patent publication No. 13,461/1966 that a 6,7-benzomorphane derivative of a secondary amine type can be converted to an amide type by acylating the former with an acid halide or acid enhydride, and the 6,7-benzomorphane derivative of an amide type can be reduced with an alkali metal complex hydride.

This process is shown, for example, as follows:

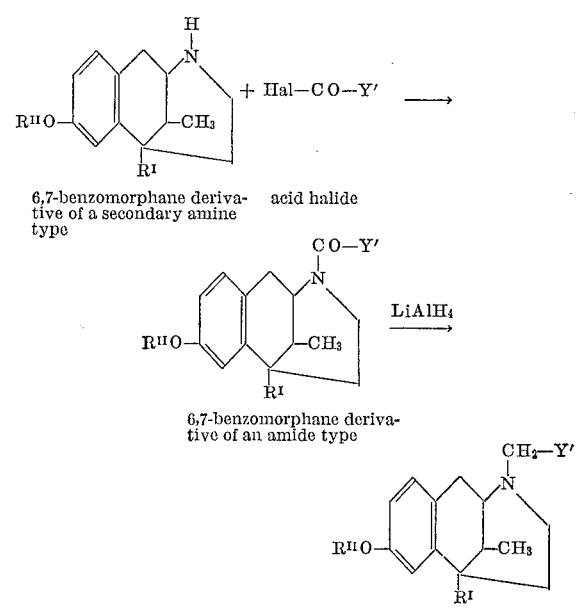

6,7-benzomorphane derivative of a secondary amine type    acid halide 6,7-benzomorphane derivative of an amide type wherein R¹ has the same meaning as defined above; and R$^{II}$ is hydrogen or methyl; Hal is a halogen; and Y' is a lower alkenyl or cycloalkyl.

However, as described above, 6,7-benzomorphane derivative of the secondary amine type to be used here must be prepared from a 2-methyl-6,7-benzomorphane derivative by complicated procedures.

The present inventors have found that a 6,7-benzomorphane derivative of an amide type can be prepared directly from a corresponding 2-methyl-6,7-benzomorphane derivative in good yield. More particularly, we have found that, when a 2-methyl-6,7-benzomorphane derivative is heated with an acid halide in an inert solvent such as benzene or toluene, a demethylation may occur at the same time with an acylation and causes production of a corresponding 6,7-benzomorphane derivative of an amide type in one step.

Further, the present inventors have found that a 6,7-benzomorphane derivative of an amine type is obtained in a good yield by reducing a corresponding 6,7-benzomorphane derivative of an amide type with trialkylaluminum or dialkylaluminum hydride.

One object of the present invention is to provide a process for producing 6,7-benzomorphane derivatives of an amine type or salts thereof from a corresponding 6,7-benzomorphane derivatives of an amide type in a good yield.

Another object is to provide a process for producing 6,7-benzomorphane derivatives of an amide type from a corresponding 2-methyl-6,7-benzomorphane derivative in a good yield.

Further, an object of the present invention is to provide a process for producing 6,7-benzomorphane derivatives of an amine type or their salts from corresponding 2-methyl-6,7-benzomorphane derivatives in a good yield.

Other objects will be apparent from the following descriptions.

In order to accomplish these objects, the present invention provides a process for producing 6,7-benzomorphane derivatives of an amine type of the formula,

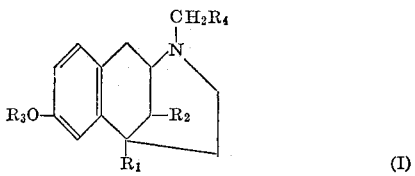

(I)

wherein $R_1$ and $R_2$ are each hydrogen, an alkyl having 1 to 3 carbon atoms or phenyl; $R_3$ is hydrogen or an alkyl having 1 to 3 carbon atoms; and $R_4$ is an unsubstituted or halogen-substituted lower alkenyl having 2 to 5 carbon atoms, cycloalkyl having 3 to 5 carbon atoms, alkinyl having 2 to 5 carbon atoms, phenyl, phenylalkyl or phenylalkenyl, or salts thereof, which comprises reacting a 6,7-benzomorphane derivative of an amide type

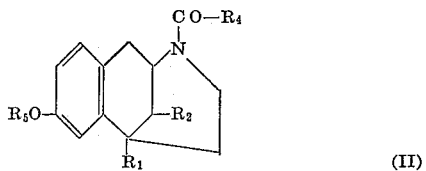

(II)

wherein $R_1$, $R_2$, $R_4$ have the same meanings as defined above, and $R_5$ is same as $R_3$ or an alkanoyl having 1 to 3 carbon atoms, with a trialkylaluminum or a dialkylaluminum hydride to yield the 6,7-benzomorphane derivative of an amine type of the Formula 1, and further, if necessary, reacting the resultant 6,7-benzomorphane derivative of an amine type of the formula with an acid to yield the salt.

Further the present invention provides a process for producing 6,7-benzomorphane derivatives of an amide type of the above mentioned Formula II, which comprises reacting a 2-methyl-6,7-benzomorphane derivative of the formula,

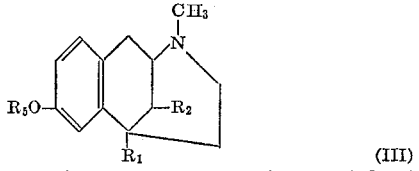

(III)

wherein $R_1$, $R_2$ and $R_5$ have the same meanings as defined above; with an acid halide of the formula,

$R_4CO—X$ (IV)

wherein $R_4$ has the same meaning as defined above; and X is a halogen.

Still further, the present invention provides a process for producing 6,7-benzomorphane derivatives of an amine type of the above mentioned Formula I, or salts thereof, which comprises reacting a 2-methyl-6,7-benzomorphane derivative of the above mentioned Formula III with an acid halide of the above mentioned Formula IV to yield a 6,7-benzomorphane derivative of an amide type of the above mentioned Formula II and then reacting the resultant 6,7-benzomorphane derivative of an amide type of the Formula II with a trialkylaluminum or a dialkylaluminum hydride to yield the 6,7-benzomorphane derivative of an amine type of the Formula I, and then, if necessary, reacting the resultant 6,7-benzomorphane derivative of an amine type of the Formula I with an acid to yield the salt.

According to the present invention, a 6,7-benzomorphane derivative of an amine type of the Formula I is obtained by reduction of a 6,7-benzomorphane derivative of an amide type of the Formula II.

In this reduction, a trialkylaluminum or a dialkylaluminum hydride is used as a reducing agent and an alkali metal complex hydride such as lithium aluminum hydride mentioned in Japanese patent publication No. 13,461/1966 is not advantageous because of poor yield. Further, the method of Japanese patent publication No. 13,461/1966 has to use ether as a reaction solvent, on the contrary, in the present process, an advantageous solvent such as benzene or toluene can also be used.

Examples of trialkylaluminum or dialkylaluminum hydride used in the present process include triethylaluminum, triisopropylaluminum, triisobutylaluminuum, diethylaluminum hydride, diisopropylaluminum hydride, diisobutylaluminum hydride, etc.

The present reduction may be carried out in a solvent such as diethylether, tetrahydrofuran, benzene, toluene, n-pentane, or n-heptane, at a temperature within the range room temperature to a boiling point of the solvent. However, even at a low temperature below 0° C., the reduction sometimes can proceed. Reaction time is usually sufficient within 2 to 6 hours.

In the process of the present invention, when a compound of the Formula II in which $R_5$ is a lower alkanoyl group is used, a 6,7-benzomorphane derivative of the Formula I in which $R_3$ is a hydrogen atom is obtained.

A stoichiometric or more amount of the reducing agent is used.

After the reaction is over, water or aqueous acidic or alkaline solution is added to the reaction mixture to inactivate the reducing agent, and the resultant organic solution is separated from the reaction mixture. The organic solution is dried and concentrated under reduced pressure to yield a crude objective product. If necessary, the crude product is purified according to a conventional method. The yield of a reduction product is always very high. If desired, the hydroxy group at 2-position of the 6,7-benzomorphane of an amine type can be converted to an alkoxy group or an acyloxy group with an alkylating agent or an acylating agent. Further, a 6,7-benzomorphane derivative of an amine type (I) obtained by the process of the present invention can be converted to a salt of an organic acid such as citric acid or oxalic acid or inorganic acid such as hydrochloric acid or sulfuric acid, by reacting the 6,7-benzomorphane derivative of the amine type with said acid, if desired, for the purpose of pharmaceutical preparation.

Examples of compounds which may be obtained by the present invention are as follows:

2'-hydroxy-2-(3''-methyl-2''-butenyl)-5,9-dimethyl-6,7-benzomorphane,
2'-hydroxy-2-(3''-methyl-2''-butenyl)-5,9-diethyl-6,7-benzomorphane,
2'-hydroxy-2-cyclopropylmethyl-5,9-dimethyl-6,7-benzomorphane,
2'-hydroxy-2-cyclopropylmethyl-5,9-diethyl-6,7-benzomorphane,
2'-hydroxy-2-cyclopropylmethyl-5,9-diethyl-6,7-benzomorphane,
2'-hydroxy-2-(3''-methyl-2''-butenyl)-5-ethyl-9-methyl-6,7-benzomorphane, 2'-hydroxy-2-propargyl-5,9-dimethyl-6,7-benzomorphane,
2'-hydroxy-2-(3''-chloro-2''-propenyl)-5,9-dimethyl-6,7-benzomorphane,
2'-hydroxy-2-(3''-methyl-2''-butenyl)-5-phenyl-6,7-benzomorphane,
2'-hydroxy-2-allyl-5-phenyl-6,7-benzomorphane,
2'-hydroxy-2-(β-phenethyl)-5-phenyl-9-methyl-6,7-benzomorphane,
2'-methoxy-2-(3''-methyl-2''-butenyl)-5,9-dimethyl-6,7-benzomorphane,
2'-acetoxy-2-(3''-methyl-2''-butenyl)-5,9-dimethyl-6,7-benzomorphane, and their salts.

These 6,7-benzomorphane derivatives are useful non-narcotic analgesics or anti-tussive agents.

Further according to the present invention, a 6,7-benzomorphane derivative of an amide type of the Formula II is obtained by reacting a 2-methyl-6,7-benzomorphane derivative of the Formula III with acid halide of the Formula IV, whereby acylation occurs at the same time with demethylation.

This reaction is carried out by following procedure.

A 2-methyl-6,7-benzomorphane derivative of the Formula III is dissolved in an inert solvent, and an acid halide of the Formula IV is added dropwise thereto. After the addition, reaction mixture is usually reacted at an elevated temperature in order to complete the reaction. The acylation reaction proceeds with occurrence of a halomethane.

As the solvent, an inert organic solvent such as benzene toluene, tetrahydrofuran and the like can be used in this reaction.

An equi-molar or more of an acid halide (IV) is necessary for reacting with a 2-methyl-6,7-benzomorphane derivative (III).

If a 2-methyl-6,7-benzomorphane derivative of the Formula III wherein $R_5$ is hydrogen is used, and 2 or more moles of a carboxylic halide is used per 1 mole of the 2-methyl-6,7-benzomorphane derivative of the Formula III, a corresponding 6,7-benzomorphane derivative of the Formula II wherein $R_5$ is alkanoyl may be obtained.

The starting 2-methyl-6,7-benzomorphane derivatives of the Formula III are known compounds.

Examples of the acid halide include for example, 3-methyl-2-butenoyl chloride, 3-methyl-2-butenoyl bromide, 2-methyl-2-butenoyl iodide, cyclopropylcarboxyl chloride, cyclopropylcarboxyl bromide, 3-chloro-2-propenoyl bromide, 4-propenoyl bromide, 4-propenoyl chloride, 2-phenylacetyl chloride, propynoyl chloride, propynoyl bromide and the like.

After completion of the reaction, the reaction mixture 6,7-benzomorphane derivative of an amide type of the Formula II. If necessary, the crude product can be purified by a conventional method. The yield of a reaction product is very high.

In the above-mentioned reduction of the present invention, the crude product of 6,7-benzomorphane derivative of an amide type (II) can be used without purification.

According to the present invention, apparently from the above description, 6,7-benzomorphane derivative of an amine type of the Formula I or 6,7-benzomorphane derivative of an amide type of the Formula II can be obtained very easily.

The present processes are more advantageous than the known processes because of the following points of view:

(1) In the present process, there is not any complicated process as in the known processes.

(2) In the present process, it is not necessary to use such special reagent as bromocyan used in the known processes.

(3) In the present invention yields of reaction products are extremely higher than those of the known processes.

The process of the present invention will be explained in more detail by referring to the following examples which are given for the purpose of illustration only and not for the limitation of the invention in any way.

EXAMPLE 1

While a solution of 2.7 g. (0.01 mol) of 2'-acetoxy-2,5,9-trimethyl-6,7-benzomorphane in 30 ml. of dry toluene was added dropwise to a solution of 4.3 g. (0.045 mole) of β,β-dimethylacryl chloride in 40 ml. of dry toluene, the mixture was maintained below 5° C.

After the addition, the mixture was heated slowly to reflux. When the internal temperature was attained to nearly 85° C., methyl chloride was violently evaporated and the reaction proceeded. When the occurrence of methyl chloride terminated, the mixture was allowed to cool and washed then with ice water, 2% hydrochloric acid and ice water in this order. After the toluene layer was dried over anhydrous magnesium sulfate, the solvent was distilled to give 3.0 g. (88.4%) of 2'-acetoxy-2-(3''-methyl-2''-butenoyl)-5,9-dimethyl-6,7-benzomorphane.

A solution of 6.8 g. (0.02 mole) of 2'-acetoxy-2-(3''-methyl-2''-butenoyl)-5,9-dimethyl-6,7-benzomorphane in 70 ml. of dry ether was added dropwise to a solution of 25.6 g. (0.18 mole) of diisobutylaluminum hydride in 100 ml. of anhydrous ether under cooling. The stirring was continued at room temperature for additional 2.5 hours to complete the reaction. After the reaction, 3% sulfuric acid was added to the mixture with stirring, and the pH of the aqueous layer was adjusted to 2.7-2.9. The ethereal layer was separated and dried over anhydrous magnesium sulfate. The ether was distilled to give 5.2 g. (91.2%) of white crystals of 2'-hydroxy-2-(3''-methyl-2''-butenyl)-5,9-dimethyl-6,7-benzomorphane, M.P. 146-148° C.

EXAMPLE 2

While a solution of 2.7 g. (0.01 mole) of 2'-acetoxy-2,5,9 - trimethyl - 6,7 - benzomorphane in 30 ml. of toluene was added to a solution of 5.2 g. (0.05 mole) of cyclopropylcarbonyl chloride in 50 ml. of dry toluene, the mixture was kept below 10° C. After the addition, the mixture was heated and refluxed. When the temperature of the reaction mixture was attained to 85° C., methyl chloride gas occurred. The reaction mixture was continued to be heated until the occurrence of gaseous methyl chloride ceased. The mixture was allowed to cool and a small amount of precipitate was removed by filtration. The toluene layer was washed with ice water, 2% aqueous caustic soda, a 1 N-hydrochloric acid and cold water successively. Then the toluene layer was dried over anhydrous magnesium sulfate and the solvent was distilled to give 2.7 g. (yield 82.7%) of 2'-acetoxy-2-cyclopropylcarbonyl-5,9-dimethyl-6,7-benzomorphane.

A solution of 2.7 g. (0.0083 mole) of 2'-acetoxy-2-cyclopropylcarbonyl - 5,9 - dimethyl-6,7-benzomorphane in 30 ml. of dry ether was added dropwise to a solution of 10.4 g. (0.073 mole) of diisobutylaluminum hydride in 100 ml. of dry ether. The mixture was stirred at room temperature for 2 hours to complete the reaction. After the reaction, 3% sulfuric acid was added to the mixture and then it was stirred. The pH of the aqueous layer was adjusted to 2.7-2.9, and the ether layer was separated and dried over anhydrous magnesium sulfate. The ether was distilled to give 2.0 g. (yield 89%) of white crystals of 2' - hydroxy - 2 - cyclopropylmethyl - 5,9 - dimethyl-6,7-benzomorphane, M.P. 202-205° C.

EXAMPLE 3

A solution of 3.4 g. (0.0125 mole) of 2'-acetoxy-2,5,9-trimethyl - 6,7 - benzomorphane in 20 ml. of dry toluene was added dropwise to a solution of 6.0 g. (0.0575 mole) of cyclopropylcarbonyl chloride in dry toluene below 10° C. with stirring. The mixture was heated slowly to reflux until occurrence of gaseous methyl chloride ceased. Excess cyclopropylcarbonyl chloride and toluene were concentrated under reduced pressure to a dark blown oily substance, which was added to 50 ml. of 2 N aqueous caustic soda solution and the mixture was heated on a water-bath for about 1 hour. After cooling, active charcoal was added to the reaction mixture and the mixture was filtered. The filtrate made acidic by addition of 2 N hydrochloric acid, the precipitate was collected by filtration, washed with water and dried to give 2.7 g. (yield 75%) of 2' - hydroxy - 2 - cyclopropylcarbonyl-5,9-dimethyl-6,7-benzomorphane. Recrystallization from methanol gave crystals having a melting point of 182–184° C.

EXAMPLE 4

A solution of 30 ml. (0.168 mole) of diisobutylaluminum hydride in 250 ml. of dry tetrahydrofuran was added to a solution of 4.0 g. (0.014 mole) of 2'-hydroxy-2-cyclopropylcarbonyl - 5,6 - dimethyl - 6,7 - benzomorphane in 100 ml. of dry tetrahydrofuran at 20–25° C. over 20 minutes with stirring. After the addition, the mixture was refluxed in a water-bath for 3.5 hours with stirring. After completion of the reaction, under cooling 80 ml. of water were slowly added below 10° C. to perfectly degrade the diisobutylaluminum hydride. Further, 250 ml. of tetrahydrofuran were added to the mixture, which was well stirred and filtered. The precipitate was washed with tetrahydrofuran. The mother liquid and the washing liquid were combined together and the tetrahydrofuran was distilled to give a light yellow oily substance to which was added 100 ml. of 1/10 N-hydrochloric acid and active charcoal and filtered. The filtrate was made strongly alkaline by adding 28% aqueous ammonia to give precipitate. The precipitate was filtered, washed with water and dried to give 3.5 g. (yield 91.0%) of 2'-hydroxy-2-cyclopropylmethyl - 5,9 - dimethyl - 6,7 - benzomorphane. Recrystallization from methanol gave crystals having a melting point of 202–203° C.

EXAMPLE 5

A solution of 6.5 g. (0.02 mole) of 2' - acetoxy-2-(cyclopropylcarbonyl) - 5,9 - dimethyl - 6,7 - benzomorphane in 70 ml. of dry ether was added dropwise to a solution of 25 g. (0.176 mole) of diisobutylaluminum hydride in 200 ml. of dry ether. The mixture was stirred at room temperature for 3 hours to complete the reaction. After completion of the reaction, 50 ml. of ice water and 3% sulfuric acid were added with stirring to adjust the pH of the aqueous layer to 2.7–2.9. Then the ethereal layer was separated and dried over anhydrous magnesium sulfate and the ether was distilled to give 4.9 g. (90.4%) of white crystals of 2'-hydroxy - 2 - cyclopropylmethyl - 5,9 - dimethyl - 6,7 - benzomorphane, M.P. 202–205° C.

EXAMPLE 6

A 30% toluene solution of 39.6 g. (0.2 mole) of triisobutylaluminum prepared at the boiling point of toluene was added dropwise to 6.5 g. (0.02 mole) of 2'-acetoxy-2 - (cyclopropylcarbonyl) - 5,9 - dimethyl - 6,7 - benzomorphane in dry toluene. After the addition the mixture was stirred at room temperature for 3 hours. After completion of the reaction, 70 ml. of ice water was added to the mixture under cooling to decompose triisobutylaluminum. Then the pH of the aqueous layer was adjusted to 2.7 with 3% sulfuric acid and the toluene layer was separated. After the toluene layer was dried, the toluene was distilled under reduced pressure to give 4.7 g. (87.0%) of 2' - hydroxy - 2 - cyclopropylmethyl - 5,9 - dimethyl-6,7 - benzomorphane, M.P. 203–205° C.

According to the procedure mentioned above, following compounds are obtained.

2'-hydroxy-2-(3''-methyl-2''-butenyl)-5,9-diethyl-6,7-benzomorphane,
2'-hydroxy-2-(3''-methyl-2''-butenyl)-5-ethyl-9-methyl-6,7-benzomorphane,
2'-hydroxy-2-(3''-methyl-2''-butenyl)-5-phenyl-6,7-benzomorphane,
2'-hydroxy-2-allyl-5-phenyl-6,7-benzomorphane,
2'-hydroxy-2-(β-phenethyl)-5-phenyl-9-methyl-6,7-benzomorphane,
2'-hydroxy-2-(2'',3''-dimethyl-2''-butenyl)-5,9-dimethyl-6,7-benzomorphane.

What we claim is:
1. A process for producing 6,7-benzomorphane derivatives of an amide type of the formula,

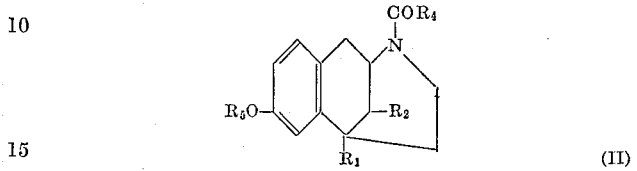

wherein $R_1$ and $R_2$ are each hydrogen, an alkyl having 1 to 3 carbon atoms or phenyl; $R_4$ is an unsubstituted or halogen-substituted lower alkenyl having 2 to 5 carbon atoms, cycloalkyl having 3 to 5 carbon atoms, alkinyl having 2 to 5 carbon atoms, phenyl, phenylalkyl or phenylalkenyl, and $R_5$ is hydrogen, an alkyl having 1 to 3 carbon atoms or an alkanoyl having 1 to 3 carbon atoms, which comprises reacting a 2-methyl-6,7-benzomorphane derivative of the formula,

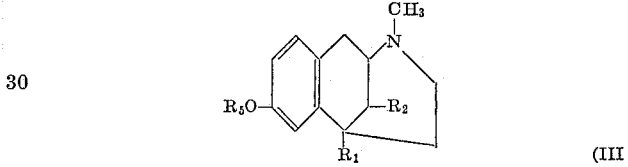

wherein $R_1$, $R_2$ and $R_5$ have the same meanings as defined above, with an acid halide of the formula,

wherein $R_4$ has the same meanings as defined above and X is a halogen, to yield the 6,7-benzomorphane derivative of an amide type of the Formula II.

2. A process for producing 6,7-benzomorphane derivatives of the formula

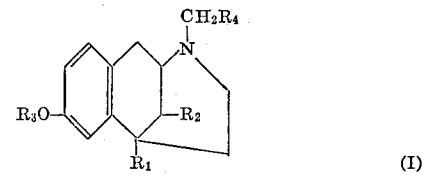

wherein $R_1$ and $R_2$ are each hydrogen, alkyl having 1 to 3 carbon atoms or phenyl, $R_3$ is hydrogen or alkyl having 1 to 3 carbon atoms and $R_4$ is an unsubstituted or halogen-substituted lower alkenyl having 2 to 5 carbon atoms, cycloalkyl having 3 to 5 carbon atoms, alkinyl having 2 to 5 carbon atoms, phenyl, phenylalkyl or phenylalkenyl, or salts thereof, which comprises reacting a 2-methyl-6,7-benzomorphane derivative of the formula

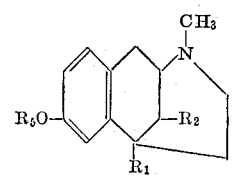

wherein $R_1$ and $R_2$ have the same meanings as above, and $R_5$ is the same as $R_3$ or an alkanoyl having 1 to 3 carbon atoms, with an acid halide of the formula

wherein $R_4$ has the same meaning as above and X is halogen, to yield a 6,7-benzomorphane derivative of the formula

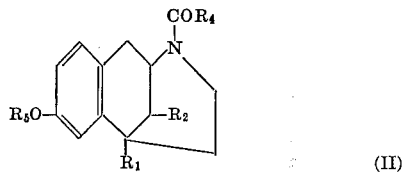

(II)

wherein $R_1$, $R_2$, $R_4$ and $R_5$ have the same meanings as above, and reacting the resultant 6,7-benzomorphane derivative II with triethylaluminum, triisopropylaluminum, triisobutylaluminum, diethylaluminum hydride, diisopropylaluminum hydride or diisobutylaluminum hydride to yield a 6,7-benzomorphane derivative I, and optionally reacting the 6,7-benzomorphane derivative I with an acid to yield the corresponding salt.

3. The process according to claim 2, wherein the compound II is reacted with triisobutylaluminum.

4. The process according to claim 2, wherein the compound II is reacted with diisobutylaluminum hydride.

References Cited

UNITED STATES PATENTS 3,372,165  3/1968  Archer ___ 260—Morphan Digest

FOREIGN PATENTS 997,637  7/1965  Great Britain __ 260—Morphan Digest

OTHER REFERENCES

Chem. Abstracts, vol. 54; 9736e, Ziegler et al., 1960.

HENRY R. JILES, Primary Examiner

S. D. WINTERS, Assistant Examiner

U.S. Cl. X.R.

260—DIG. 13; 424—267